(12) United States Patent
Rose et al.

(10) Patent No.: US 6,605,920 B1
(45) Date of Patent: Aug. 12, 2003

(54) METHOD AND APPARATUS FOR LARGE MOTOR CONTROL

(75) Inventors: Chris R. Rose, Santa Fe, NM (US); Ronald O. Nelson, White Rock, NM (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 10/045,822

(22) Filed: Nov. 6, 2001

(51) Int. Cl.[7] ............................... H02P 5/28; H02P 7/36
(52) U.S. Cl. ...................... 318/799; 318/268; 318/456; 318/461; 318/597; 318/615; 318/635; 318/807
(58) Field of Search ................................. 318/597, 615, 318/635, 798, 799, 807, 808, 812, 268, 456, 461

(56) References Cited

U.S. PATENT DOCUMENTS

| | | | | |
|---|---|---|---|---|
| 3,980,936 A | * | 9/1976 | Wright | 318/246 |
| 4,677,360 A | * | 6/1987 | Garces | 318/803 |
| 5,610,507 A | * | 3/1997 | Brittan | 323/350 |
| 5,923,133 A | * | 7/1999 | Menegoli | 318/254 |
| 6,020,699 A | * | 2/2000 | Maggio et al. | 318/254 |
| 6,366,043 B1 | * | 4/2002 | Stancu et al. | 318/432 |
| 6,483,271 B1 | * | 11/2002 | Thebeau et al. | 318/802 |

* cited by examiner

Primary Examiner—Bentsu Ro
Assistant Examiner—Rina I. Duda
(74) Attorney, Agent, or Firm—James C. Durkis; Paul A. Gottlieb

(57) ABSTRACT

Apparatus and method for providing digital signal processing method for controlling the speed and phase of a motor involves inputting a reference signal having a frequency and relative phase indicative of a time based signal; modifying the reference signal to introduce a slew-rate limited portion of each cycle of the reference signal; inputting a feedback signal having a frequency and relative phase indicative of the operation of said motor; modifying the feedback signal to introduce a slew-rate limited portion of each cycle of the feedback signal; analyzing the modified reference signal and the modified feedback signal to determine the frequency of the modified reference signal and of the modified feedback signal and said relative phase between said modified reference signal and said modified feedback signal; and outputting control signals to the motor for adjusting said speed and phase of the motor based on the frequency determination and determination of the relative phase.

11 Claims, 4 Drawing Sheets

METHOD AND APPARATUS FOR LARGE MOTOR CONTROL

The present invention generally relates to motor control, and more particularly, to precise speed and phase control of large motors driving heavy loads. This invention was made with Government support under Contract No. W-7405-ENG-36 awarded by the U.S. Department of Energy. The Government has certain rights in the invention.

BACKGROUND OF THE INVENTION

In many industrial and government applications, motors are required to drive very large inertial loads in as precise a manner as is possible. For example, at Los Alamos National Laboratory, large motors drive extremely heavy "neutron choppers" that allow neutrons from a source to pass to a target in synchronized pulses. The neutron chopper system has a heavy spinning rotor that must be rotated in phase-locked synchronism with a reference pulse train based on an alternating current power supply that inherently has a meandering line frequency.

The actual chopper used at Los Alamos National Laboratory consists of a heavy, slotted metal cylinder that is suspended in a neutron beam and that is spun in phase-locked synchronism with 120 Hz pulses obtained from a heavy-duty electrical grid supply. The problem presented when trying to maintain precise control of the chopper is that the frequency of the electrical grid supply varies slightly from its nominal value of 60 Hz, which is, after all, only a per day average frequency. Short term deviations in the frequency of the electrical grid are approximately Gaussian in distribution, with approximately 0.015 Hz rms value, and are of exponentially diminishing spectral density with approximately 0.035 Hz FWHM (full wave half-maximum) spread. Therefore, rotational energy, in properly controlled quantities, must be continually transferred into and out of the neutron chopper in order to keep its angle of rotation in phase alignment with the zero-crossings of the power from the electrical grid.

There has been a great deal of research and development in devices intended to provide a proper level of control for this application. These devices originally were analog devices that could provide control with approximately 100 $\mu$s differential with the power system zero crossings. More recently, digital circuits have been developed that provide a greater level of precision. However, the present controllers using digital signal processing are expensive and complicated.

The present invention provides an effective control system for these large loaded systems that is a hybrid between analog and digital techniques and is simpler and less expensive than those of the prior art. It uses commercially available digital signal processors along with off the shelf components to provide precision control of large loads that are to be connected to the electrical grid and synchronized with it through the motor control circuitry of the present invention.

It is therefore an object of the present invention to provide precise speed and phase control for large motor loads that must be synchronized with a a fixed or slowly varying reference signal.

It is another object of the present invention to provide speed and phase control for large motor loads that is very accurate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a digital signal processing method for controlling the speed and phase of a motor comprises the steps of: inputting a reference signal having a frequency and relative phase indicative of a time based signal; modifying the reference signal to introduce a slew-rate limited portion of each cycle of the reference signal; inputting a feedback signal having a frequency and relative phase indicative of the operation of the motor; modifying the feedback signal to introduce a slew-rate limited portion of each cycle of the feedback signal; analyzing the modified reference signal and the feedback signal to determine the frequency of the modified reference signal and of the modified feedback signal and the relative phase between the modified reference signal and the modified feedback signal; and outputting control signals to the motor for adjusting the speed and phase of the motor based on the frequency determination and determination of the relative phase.

In a further aspect of the present invention and in accordance with its objects and principles apparatus for controlling the speed and phase of a motor using digital signal processing comprises a reference signal having a frequency and relative phase indicative of a time-based signal for use in controlling said motor with a first slew-rate limiter receiving the reference signal for introducing a slew-rate limited portion of each cycle of the reference signal. A feedback signal having a frequency and relative phase indicative of operation of said motor with a second slew-rate limiter receiving the feedback signal for introducing a slew-rate limited portion of each cycle of the feedback signal. A digital signal processing circuit receives the slew-rate limited reference signal and the slew-rate limited feedback signal for determining the frequency of the slew-rate limited reference signal and of the slew-rate limited feedback signal, and the relative phase between the slew-rate limited reference signal and the slew-rate limited feedback signal, and for providing therefrom a control signal for controlling the frequency and phase of the motor.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for controlling the speed and phase of large load motors. The invention can be understood most easily through reference to the drawings.

Figure 1:
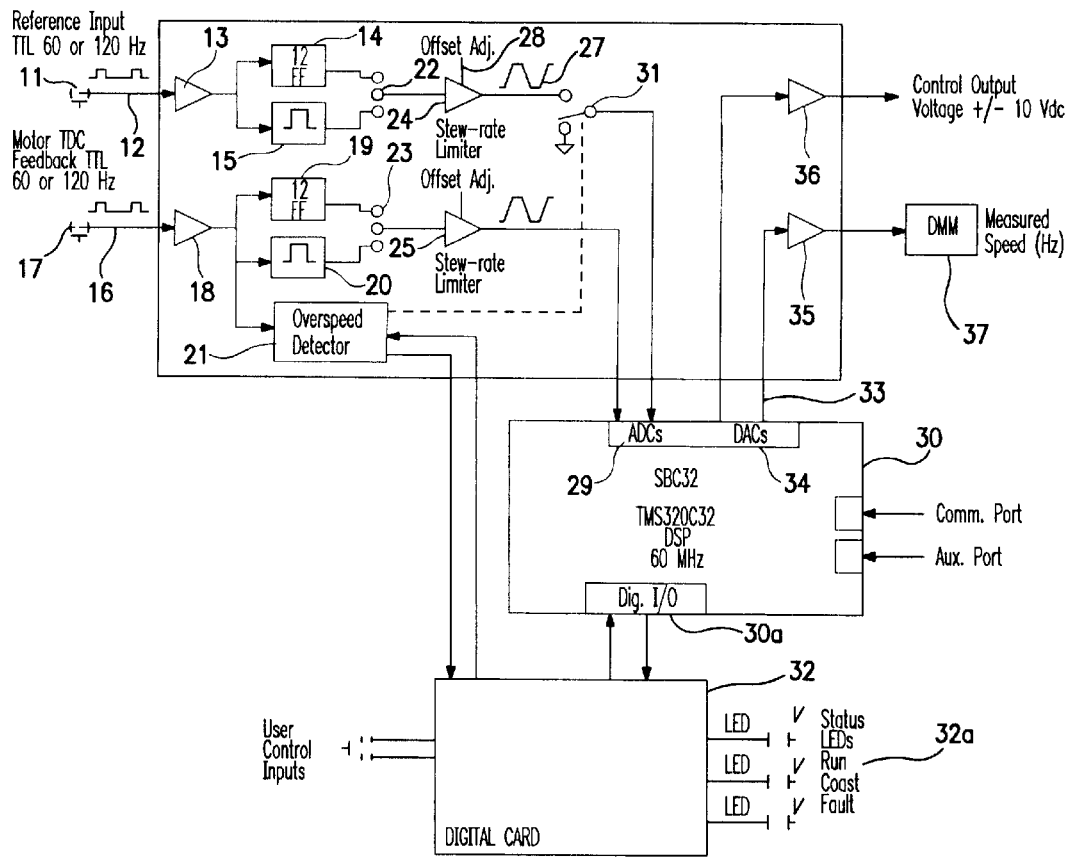
FIG. 1 is a block diagram of an embodiment of the present invention.

Turning first to FIG. 1, there can be seen a block diagram of one embodiment of the present invention in which reference input 11 provides reference signals 12, which may be TTL 60 or 120-Hz signals or any other fixed or slowly varying reference signal obtained from an electrical utility or other source to logic buffer 13. Logic buffer 13 then provides reference signals 12 to divide-by-two flip-flop 14 and to one-shot timer 15 Likewise, motor top-dead-center (TDC) feedback signals 16 from the motor (not shown) controlled by the present invention are provided to feedback input 17 and to logic buffer 18. Logic buffer 18 provides motor TDC feedback signals 16 to divide-by-two flip-flop 19, to one-shot timer 20, and to overspeed detector 21. Divide by two flip-flops 14, 19 are used when reference signals 12 have a frequency of 120-Hz, and one-shot timers 15, 20 are used for all other frequencies. Although FIG. 1 illustrates reference signals 12 as 60 or 120 Hz signals, it should be clearly understood that other frequency signals could be used with only minor modifications to the control software.

The outputs of divide-by-two flip-flop 14 and one-shot timer 15 are connected to switch 22, the central pole of which is connected to slew-rate limiter 24. The outputs of divide-by-two flip-flop 19 and one-shot timer 20 likewise are connected to switch 23, the central pole of which is connected to slew-rate limiter 25. As seen, switches 22, 23, which can be implemented as jumpers, allow either the output of divide-by-two flip-flops 14, 19 or one-shot timers 15, 20 to be input to slew-rate limiters 24, 25 based on the frequency of reference signals 12 and TDC feedback signals 16. In slew-rate limiters 24, 25, the digital signals of reference signals 12 and TDC feedback signals 16 are modified slightly to an analog slew-rated limited form. This allows implementation of the present invention using standard components such as sampling ADCs and requiring little custom hardware engineering.

Figure 2:
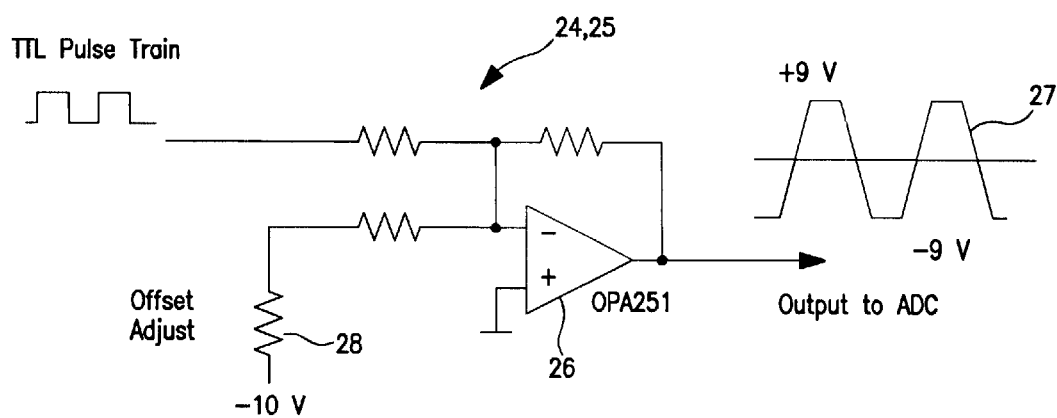
FIG. 2 is a simplified schematic diagram of the slew-rate limiting circuit of the present invention.

Slew-rate limiters 24, 25 are simple operational amplifiers (OP AMP) circuits as shown in simplified form in FIG. 2, and utilize an operational amplifier 26, such as a OPA251 OP AMP. Although other OP AMPs could be used, the OPA251 is one appropriate choice for this application. It slews at a rate of approximately 0.01 V/μs, providing approximately 107 ms of rise and fall time in the outputted signals. The fast rise and fall times of the input reference signals 12 and TDC feedback signals 16 are converted to trapezoidal shaped signals 27 by slow operational amplifier 26. Offset adjustment 28 is a potentiometer used for initial calibration to adjust the positive and negative symmetry of output trapezoidal shaped signals 27. Offset adjustment 28 is not strictly necessary because the relative phase of reference signals 12 and TDC feedback signals 16 can be adjusted digitally in a control algorithm.

Returning to FIG. 1, it can be seen that trapezoidal shaped signals 27 are output from slew-rate limiters 24, 25 to 16-bit analog to digital converters (ADC) 29 in digital signal processing (DSP) board 30. 16-bit ADC 29 has a signal-to-noise ratio of approximately 72 dB. Using that value, and the rise and fall time of reference signals 12 and TDC feedback signals 16, DSP 30 can measure either signal's period to within approximately 300 ns.

As shown, TDC feedback signals 16 are fed to overspeed detector 21 so that the rotational speed of the motor controlled (not shown) can be monitored. Should the motor speed exceed a predetermined maximum, overspeed detector inhibits switch 31 and sends a signal to digital card 32 so that the overspeed condition can be indicated.

Analog control signals 33 from 16-bit DAC 34 of DSP board 30 are buffered by buffers 35, 36 and provided to motor's power amplifier (not shown) and to front panel meter 37. Front panel meter 37 provides status and monitoring information for an operator.

Digital card 32 serves primarily as a signal pass-through card, and routes signals from front-panel momentary switches (not shown) to 16-bit digital I/O port 30a of DSP board 30. Digital card 32 also provides the conditioning necessary to drive status light emitting diodes (LED) 32a.

DSP board 30 is a TMS320C32 DSP available from Innovative Integration, Inc. It uses "C32 floating-point DSP" and runs at 60 MHz, and has a main serial communication port for communication with DSP board 30, a second port that can be programmed for data I/O, a 16-bit digital I/O port, four 16-bit ADCs 29, and four 16-bit DACs 34. DSP board 30 can be programmed to operate using an on-board flash programmable read only memory (PROM) (not shown). Upon power up of the present invention, DSP card 30 boots and loads a control program from the PROM, allowing a stand-alone speed and phase motor control system.

Figure 3:
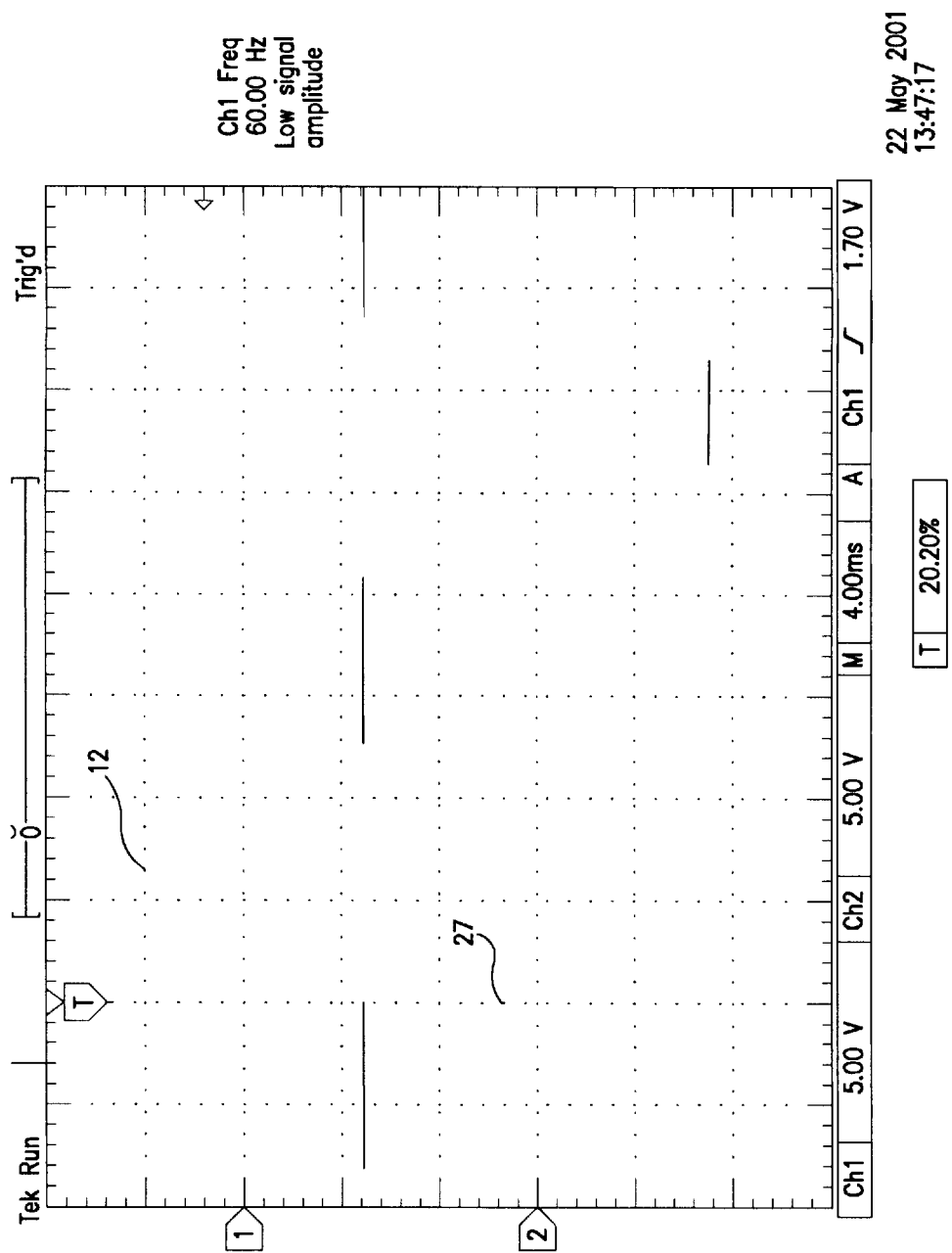
FIG. 3 is a plot of the input signals and the slew-rated signals of the present invention.

Example waveforms of input reference signals 12 and slew-rate limiter 24 outputs 27 to 16-bit ADC 29 are shown in FIG. 3. The range on these illustrations is from approximately +9 V to −9 V, with a fall time of approximately 1.7 ms. Reference signals 12 are the upper trace and slew-rate limiter 24 outputs 27 are shown in the lower trace. As seen, slew-rate limiter 24, and slew-rate limiter 25 invert the polarity of input reference signals 12. DSP board 30 is programmed to determine the phase and frequency of input reference signals 12 at negatively sloped zero crossings. This is advantageous when using one-shot timer 15 (FIG. 1) because one-shot timers have negligible jitter on their rising edges, but an unacceptable amount of jitter on their falling edges. It should be noted that slope is of no consequence when using divide-by-two flip-flop 14 (FIG. 1).

Another extremely useful feature of the present invention is that auxiliary RS-232 port of DSP board 30 can be used on a local network, using a National Instruments ENET-232/4 ethernet-to-RS232 interface (or other RS-232 to Ethernet conversion device), for remote control of the motor. Employing this remote connection, a user can monitor motor performance, adjust loop-control parameters, and start and stop the motor.

Figure 4:
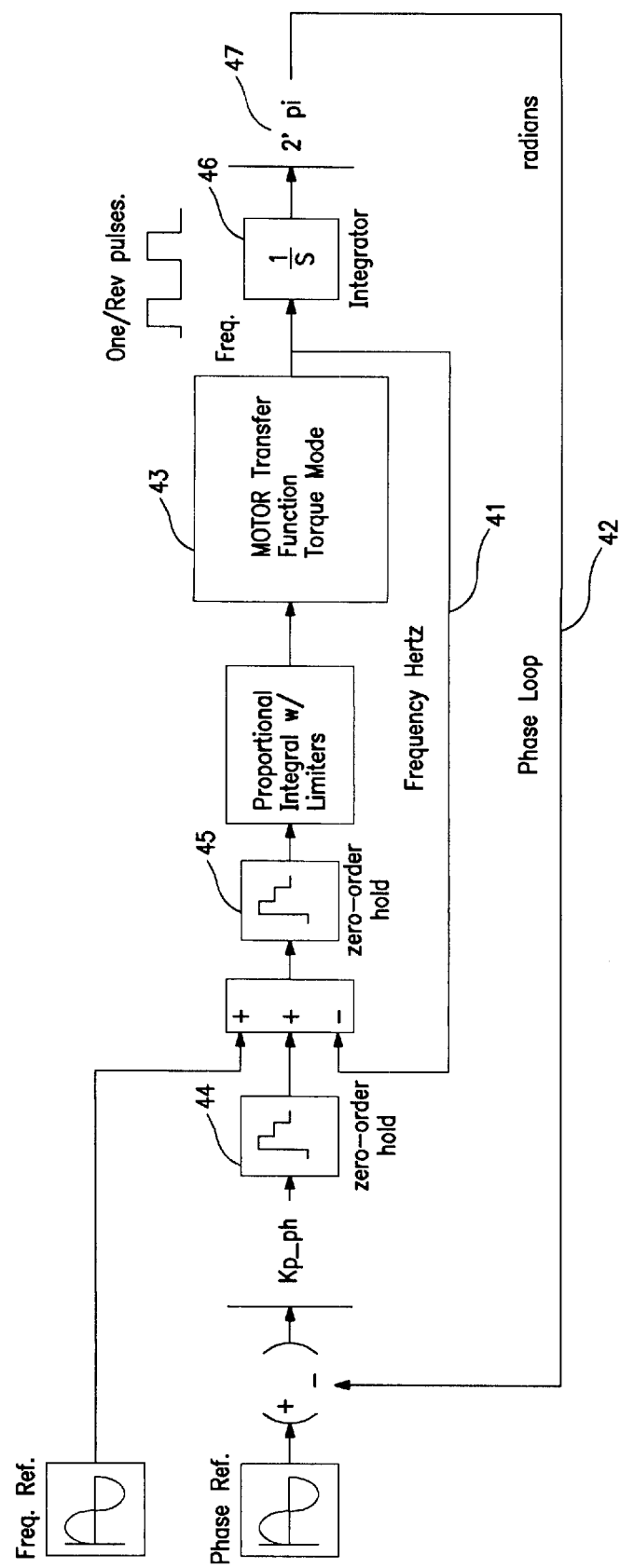
FIG. 4 is a Simulink/ MATLAB® control-system model of the operation of the present invention.

FIG. 4 illustrates a Simulink/MATLAB® block diagram 40 of the present invention implementing a dual-loop topology. Inner velocity loop 41 controls motor speed while outer phase loop 42 controls phase. Motor transfer function 43 is shown as a block and incorporated fully as a s-parameter model when simulating the present invention.

As shown in FIG. 4, inner velocity loop 41 utilizes only proportional and integral terms. For the PHAROS T-zero chopper used at Los Alamos National Laboratory, the proportional term is about 275, and the integral term is about 2.0. Outer phase loop 42 is controlled only by a proportional gain term, Kp_ph, which is about 1.0. DSP board 30 (FIG. 1) samples the incoming waveforms and runs internally at 3 kHz, but inner velocity loop 41 runs at the rate of reference signals 12 (FIG. 1),such as a power grid frequency, which normally runs at approximately 60 Hz. The two zero-order holds 44, 45 ensure model integrity at the rate of inner velocity loop 41. Integrator 46 and $2\pi$ block 47 convert frequency in Hertz to phase in radians.

Several tests of the present invention were conducted successfully. In one such test, the slew-rate method was confirmed as an accurate measurement technique. The collected data showed that the present invention is capable of measuring the frequency of an input signal (60.0000 Hz) to the fourth decimal place. This fulfilled the expectation of approximately 300 ns period uncertainty. The present invention has been successfully operated with the large-inertial PHAROS chopper at Los Alamos National Laboratory, which spins at 60 Hz. The present invention was able to control the chopper phase to between 350 and 2000 ns with respect to the reference phase, depending on the jitter of the reference signal.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A digital signal processing method for controlling the speed and phase of a motor comprising the steps of:

inputting a reference signal having a frequency and relative phase indicative of a time based signal;

modifying said reference signal to introduce a slew-rate limited portion of each cycle of said reference signal;

inputting a feedback signal having a frequency and relative phase indicative of the operation of said motor;

modifying said feedback signal to introduce a slew-rate limited portion of each cycle of said feedback signal;

analyzing said modified reference signal and said feedback signal to determine said frequency of said modified reference signal and of said modified feedback signal and said relative phase between said modified reference signal and said modified feedback signal; and outputting control signals to said motor for adjusting said speed and phase of said motor based on said frequency determination and said relative phase.

2. The method as described in claim 1, wherein said reference signal has a frequency of 120-Hz, further comprising a step of dividing said 120-Hz frequency by two to obtain a reference signal having a frequency of 60-Hz.

3. The method as described in claim 1, wherein said feedback signal has a frequency of 120-Hz, further comprising a step of dividing said 120-Hz frequency by two to obtain a reference signal having a frequency of 60-Hz.

4. The method as described in claim 1, wherein said reference signal has a frequency of 60-Hz.

5. The method as described in claim 1, further comprising the step of visually indicating status of said motor.

6. Apparatus for controlling the speed and phase of a motor using digital signal processing comprises:

a reference signal having a frequency and relative phase indicative of a time-based signal for use in controlling said motor; a first slew-rate limiter receiving said reference signal for introducing a slew-rate limited portion of each cycle of said reference signal;

a feedback signal having a frequency and relative phase indicative of operation of said motor;

a second slew-rate limiter receiving said feedback signal for introducing a slew-rate limited portion of each cycle of said feedback signal;

a digital signal processing circuit receiving said slew-rate limited reference signal and said slew-rate limited feedback signal for determining said frequency of said slew-rate limited reference signal and of said slew-rate limited feedback, and said relative phase between said slew-rate limited reference signal and said slew-rate limited feedback signal, and for providing therefrom a control signal for controlling said frequency and phase of said motor.

7. The apparatus as described in claim 6, wherein said frequency of said reference signal is 120-Hz.

8. The apparatus as described in claim 7, further comprising a flip-flop for dividing said frequency of certain of said reference signals by two.

9. The apparatus as described in claim 6, wherein said frequency of said feedback signal is 120-Hz.

10. The apparatus as described in claim 8, further comprising a flip-flop for dividing said frequency of certain of said feedback signals by two.

11. The apparatus of claim 6, further comprising status means for visually indicating status of said motor.

* * * * *